(12) United States Patent
Drochomirecki et al.

(10) Patent No.: US 11,816,111 B2
(45) Date of Patent: Nov. 14, 2023

(54) METHODS, SYSTEMS, AND MEDIA FOR PRESENTING RELATED MEDIA CONTENT ITEMS

(71) Applicant: Google LLC, Mountain View, CA (US)

(72) Inventors: Przemek Drochomirecki, Cracow (PL); Grzegorz Glowaty, Cracow (PL); Christian Brumm, Brooklyn, NY (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 16/798,647

(22) Filed: Feb. 24, 2020

(65) Prior Publication Data

US 2020/0192905 A1    Jun. 18, 2020

Related U.S. Application Data

(63) Continuation of application No. 15/525,722, filed as application No. PCT/US2015/061640 on Nov. 19, 2015, now Pat. No. 10,572,491.

(Continued)

(51) Int. Cl.
*G06F 16/2457* (2019.01)
*G06F 16/48* (2019.01)
(Continued)

(52) U.S. Cl.
CPC ...... *G06F 16/24578* (2019.01); *G06F 16/438* (2019.01); *G06F 16/48* (2019.01); *G06F 16/951* (2019.01); *G06F 16/9535* (2019.01)

(58) Field of Classification Search
CPC ............ G06F 16/24578; G06F 16/438; G06F 16/9535; G06F 16/951; G06F 16/48
See application file for complete search history.

(56) References Cited

U.S. PATENT DOCUMENTS 6,167,382 A    12/2000  Sparks et al.
6,374,260 B1   4/2002   Hoffert et al.
(Continued)

FOREIGN PATENT DOCUMENTS

WO    WO 2010048428    4/2010

OTHER PUBLICATIONS

International Search Report & Written Opinion of the International Searching Authority dated Feb. 11, 2016 in International Patent Application No. PCT/US2015/061640.

(Continued)

*Primary Examiner* — Ken Hoang
(74) *Attorney, Agent, or Firm* — Brake Hughes Bellermann LLP

(57) ABSTRACT

Methods, systems, and media for presenting related media content items are provided. In accordance with some implementations, a method for providing media guidance is provided, the method comprising: receiving, from a user device, a search query for a media content item; determining a plurality of media content items that are related to the media content item; determining a plurality of keywords associated with each of the plurality of related media content items; generating a document containing the plurality of keywords that are associated with each of the plurality of related media content items; calculating a score for each of the plurality of keywords in the document based on a term frequency and an inverse document frequency for each of the plurality of keywords; selecting a first keyword from a list of the plurality of keywords based at least in part on the calculated score; determining a first subset of related media content items, wherein each media content item in the first subset is associated with the selected first keyword; removing the selected first keyword from the list of the plurality of keywords and selecting a second keyword from the list of (Continued)

the plurality of keywords based at least in part on the calculated score; determining a second subset of related media content items, wherein each media content item in the second subset is associated with the selected second keyword; and causing the first subset and the second subset of related media content items to be presented along with a relatedness indicator, wherein the relatedness indicator is generated using the first keyword for the first subset and the second keyword for the second subset.

18 Claims, 5 Drawing Sheets

Related U.S. Application Data

(60) Provisional application No. 62/082,067, filed on Nov. 19, 2014.

(51) Int. Cl.
    *G06F 16/438* (2019.01)
    *G06F 16/951* (2019.01)
    *G06F 16/9535* (2019.01)

(56) References Cited

U.S. PATENT DOCUMENTS

| | | | |
|---|---|---|---|
| 6,834,308 B1 | 12/2004 | Ikezoye et al. | |
| 8,166,029 B2 * | 4/2012 | Park | G06F 16/78 707/732 |
| 8,484,192 B1 * | 7/2013 | Sahami | G06F 16/9535 707/708 |
| 8,495,051 B2 | 7/2013 | Kruglick | |
| 8,965,870 B2 | 2/2015 | Chen et al. | |
| 8,996,538 B1 | 3/2015 | Cremer et al. | |
| 9,519,936 B2 | 12/2016 | Vijayaraghavan et al. | |
| 9,628,873 B2 | 4/2017 | Hu et al. | |
| 9,788,055 B2 | 10/2017 | Verrilli et al. | |
| 2003/0195877 A1 | 10/2003 | Ford et al. | |
| 2006/0212478 A1 | 9/2006 | Plastina et al. | |
| 2008/0140644 A1 * | 6/2008 | Franks | G06F 16/40 |
| 2008/0195595 A1 | 8/2008 | Masuyama et al. | |
| 2009/0305680 A1 | 12/2009 | Swift et al. | |
| 2010/0005087 A1 | 1/2010 | Basco et al. | |
| 2012/0072937 A1 * | 3/2012 | Ikeda | H04N 21/4126 725/10 |
| 2012/0131034 A1 * | 5/2012 | Kenedy | G06F 16/9535 707/767 |
| 2013/0151548 A1 * | 6/2013 | Jin | G06F 16/48 707/769 |
| 2014/0067368 A1 | 3/2014 | Yih et al. | |
| 2014/0067846 A1 | 3/2014 | Edwards et al. | |
| 2014/0074866 A1 | 3/2014 | Shah et al. | |
| 2014/0236931 A1 | 8/2014 | Smith et al. | |
| 2015/0066897 A1 | 3/2015 | Vronay et al. | |
| 2015/0074552 A1 | 3/2015 | Chai et al. | |
| 2015/0296228 A1 | 10/2015 | Chen et al. | |
| 2015/0310307 A1 | 10/2015 | Gopalan | |
| 2015/0324365 A1 * | 11/2015 | Becker | G06F 16/248 707/723 |
| 2018/0181988 A1 | 6/2018 | Wei et al. | |

OTHER PUBLICATIONS

Notice of Allowance dated Oct. 17, 2019 in U.S. Appl. No. 15/525,722.
Office Action dated May 20, 2019 in U.S. Appl. No. 15/525,722.
Office Action dated Dec. 19, 2018 in U.S. Appl. No. 15/525,722.

* cited by examiner

METHODS, SYSTEMS, AND MEDIA FOR PRESENTING RELATED MEDIA CONTENT ITEMS

CROSS-REFERENCE TO RELATED APPLICATIONS

This application is a continuation of U.S. patent application Ser. No. 15/525,722, filed May 10, 2017, which is a national stage application under 35 U.S.C. § 371 of International Patent Application No. PCT/US2015/061640, filed Nov. 19, 2015, which claims the benefit of U.S. Provisional Patent Application No. 62/082,067, filed Nov. 19, 2014, each of which is incorporated by reference herein in its entirety.

TECHNICAL FIELD

The disclosed subject matter relates to methods, systems, and media for presenting related media content items.

BACKGROUND

In response to searching for media content, such as a movie, the user is generally presented with a list of related content. For example, upon receiving a search query for a movie entitled "Movie A," the user can be presented with information relating to "Movie A" that includes a description of the movie, a movie rating, a list of actors and actresses appearing in the movie along with a list of related movies. This list of related movies having some relation to "Movie A" is, however, typically lengthy, where only a small number of the movies in the list are of interest to the user.

Accordingly, it is desirable to provide new methods, systems, and media for presenting related media content items.

SUMMARY

Methods, systems, and media for presenting related media content items are provided.

In accordance with some implementations of the disclosed subject matter, a method for providing media guidance is provided, the method comprising: receiving, from a user device, a search query for a media content item; determining a plurality of media content items that are related to the media content item; determining a plurality of keywords associated with each of the plurality of related media content items; generating a document containing the plurality of keywords that are associated with each of the plurality of related media content items; calculating a score for each of the plurality of keywords in the document based on a term frequency and an inverse document frequency for each of the plurality of keywords; selecting a first keyword from a list of the plurality of keywords based at least in part on the calculated score; determining a first subset of related media content items, wherein each media content item in the first subset is associated with the selected first keyword; removing the selected first keyword from the list of the plurality of keywords and selecting a second keyword from the list of the plurality of keywords based at least in part on the calculated score; determining a second subset of related media content items, wherein each media content item in the second subset is associated with the selected second keyword; and causing the first subset and the second subset of related media content items to be presented along with a relatedness indicator, wherein the relatedness indicator is generated using the first keyword for the first subset and the second keyword for the second subset.

In accordance with some implementations of the disclosed subject matter, a system for providing media guidance is provided, the system comprising a hardware processor that is configured to: receive, from a user device, a search query for a media content item; determine a plurality of media content items that are related to the media content item; determine a plurality of keywords associated with each of the plurality of related media content items; generate a document containing the plurality of keywords that are associated with each of the plurality of related media content items; calculate a score for each of the plurality of keywords in the document based on a term frequency and an inverse document frequency for each of the plurality of keywords; select a first keyword from a list of the plurality of keywords based at least in part on the calculated score; determine a first subset of related media content items, wherein each media content item in the first subset is associated with the selected first keyword; remove the selected first keyword from the list of the plurality of keywords and selecting a second keyword from the list of the plurality of keywords based at least in part on the calculated score; determine a second subset of related media content items, wherein each media content item in the second subset is associated with the selected second keyword; and cause the first subset and the second subset of related media content items to be presented along with a relatedness indicator, wherein the relatedness indicator is generated using the first keyword for the first subset and the second keyword for the second subset.

In accordance with some implementations of the disclosed subject matter, a nontransitory computer-readable medium containing computer-executable instructions that, when executed by a hardware processor, cause the processor to perform a method for providing media guidance, is provided. The method comprises: receiving, from a user device, a search query for a media content item; determining a plurality of media content items that are related to the media content item; determining a plurality of keywords associated with each of the plurality of related media content items; generating a document containing the plurality of keywords that are associated with each of the plurality of related media content items; calculating a score for each of the plurality of keywords in the document based on a term frequency and an inverse document frequency for each of the plurality of keywords; selecting a first keyword from a list of the plurality of keywords based at least in part on the calculated score; determining a first subset of related media content items, wherein each media content item in the first subset is associated with the selected first keyword; removing the selected first keyword from the list of the plurality of keywords and selecting a second keyword from the list of the plurality of keywords based at least in part on the calculated score; determining a second subset of related media content items, wherein each media content item in the second subset is associated with the selected second keyword; and causing the first subset and the second subset of related media content items to be presented along with a relatedness indicator, wherein the relatedness indicator is generated using the first keyword for the first subset and the second keyword for the second subset.

In accordance with some implementations of the disclosed subject matter, a system for providing media guidance is provided, the system comprising: means for receiving, from a user device, a search query for a media content item; means for determining a plurality of media content items that are related to the media content item; means for determining a plurality of keywords associated with each of the plurality of related media content items; means for generating a document containing the plurality of keywords that are associated with each of the plurality of related media content items; means for calculating a score for each of the plurality of keywords in the document based on a term frequency and an inverse document frequency for each of the plurality of keywords; means for selecting a first keyword from a list of the plurality of keywords based at least in part on the calculated score; means for determining a first subset of related media content items, wherein each media content item in the first subset is associated with the selected first keyword; means for removing the selected first keyword from the list of the plurality of keywords and selecting a second keyword from the list of the plurality of keywords based at least in part on the calculated score; means for determining a second subset of related media content items, wherein each media content item in the second subset is associated with the selected second keyword; and means for causing the first subset and the second subset of related media content items to be presented along with a relatedness indicator, wherein the relatedness indicator is generated using the first keyword for the first subset and the second keyword for the second subset.

In some implementations, each of the plurality of related media content items and the media content have the same media type.

In some implementations, the score is calculated by: calculating the term frequency for each of the plurality of keywords, wherein the term frequency represents a frequency of occurrence of the keyword within a field associated with a related media content item; calculating the inverse document frequency for each of the plurality of keywords, wherein the inverse document frequency represents a frequency of occurrence of the keyword across a plurality of fields corresponding to the plurality of related media content items; and combining the term frequency and the inverse document frequency to generate the score for each of the plurality of keywords.

In some implementations, the first keyword has the highest score and the second keyword has the next highest score.

In some implementations, the system further comprises means for repeatedly selecting a next keyword from the plurality of keywords until a threshold number of subsets of related media content items has been determined.

In some implementations, the system further comprises means for repeatedly selecting a next keyword from the plurality of keywords until no keywords remain in the list of the plurality of keywords.

In some implementations, the system further comprises means for rank ordering the first subset of related media content items and the second subset of related media content items based at least in part on the score.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements.

DETAILED DESCRIPTION

Figure 1:
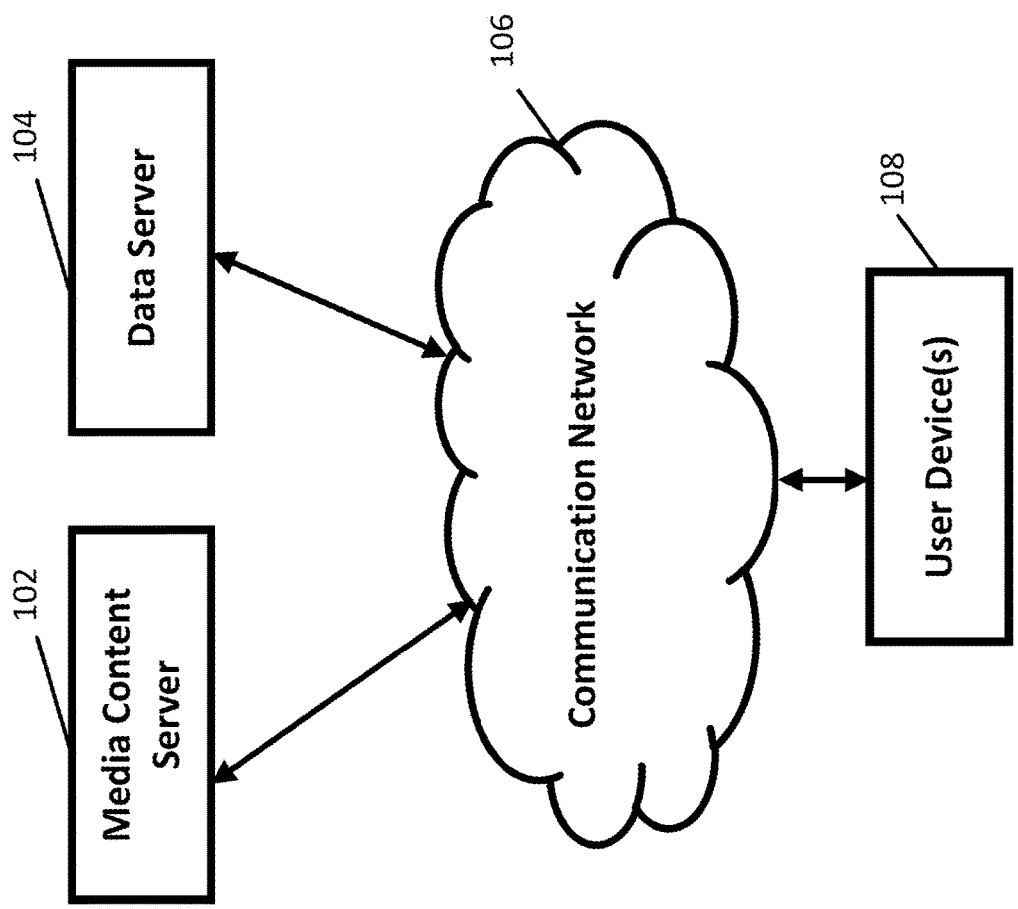
FIG. 1 shows a schematic diagram of an example of a system for presenting related media content items in accordance with some implementations of the disclosed subject matter.

In accordance with various implementations, mechanisms (which can include methods, systems, and media) for presenting related media content items are provided.

In some implementations, the mechanisms can receive a search query that requests a particular media content item, such as a television program, a movie, a video, a song, an audiobook, and/or any other suitable media content item. It should be noted that these mechanisms can be applied to any suitable content type, such as movies, television programs, books, people, etc. The mechanisms can then determine a list of media content items that are related to the media content item. For example, in response to a search query for "Movie A," a list of movies related to "Movie A" can be determined. This list can then be decomposed or otherwise classified into multiple subsets of related media content items. For example, using keywords extracted from each media content item, the related media content items can be organized into a subset of media content items that includes "other critically acclaimed movies," a subset of media content items that includes "other movies with Actor A," a subset of media content items that includes media content items "based on other works by Author A," a subset of media content items that includes media content items "about prison escape," a subset of media content items that includes "dramas about miscarriage of justice," etc.

In some implementations, these subsets of related media content items can be generated by extracting keywords associated with each media content item in the list of related media content items. For example, movies that are deemed to be related to the movie "Movie A" can include keywords, such as "prison escape," "Author A," "Main Character A," "miscarriage of justice," etc. In some implementations, a document that includes the related media content items and the extracted keywords can be generated. For example, the document can include a set of keywords and movies corresponding to each movie in the list of related content items.

In some implementations, a keyword score for each of the extracted keywords can be calculated. For example, the keyword score can be based on a term frequency and an inverse document frequency. In a more particular example, a term frequency (TF) that represents a frequency of occurrence of the keyword within a field associated with a related media content item can be calculated and an inverse document frequency (IDF) that represents a frequency of occurrence of the keyword across different fields corresponding to the related media content items, such as in a whole document, can be calculated, where the term frequency (TF) and the inverse document frequency (IDF) can be combined to generate the keyword score for each of the extracted keywords.

Upon generating a keyword score for each of the extracted keywords, a keyword can be selected based on the keyword score. For example, the keyword having the highest keyword score can be selected for use. Each of the related media content items containing the selected keyword can be placed into a subset of related media content items. For example, each movie containing the keyword "prison escape" can be placed into a subset of related media content items relating to "prison escape." These selected keywords can, for example, be used to describe a media content item and can be used to determine a subset of media content items that also share the selected keyword or keywords.

In some implementations, the use of keywords to create subsets of related media items can be repeated. For example, after generating the subset of related media content items that relate to "prison escape," the previously selected keyword can be removed from a list of available keywords and another keyword can be selected (e.g., the keyword having the highest keyword score now that the previously used keyword has been removed). Each of the related media content items containing this next selected keyword can be placed into another subset of related media content items.

It should be noted that the creation of subsets of related media content items can be repeated any suitable number of times and based on any suitable criterion. For example, the creation of subsets of related media content items can be repeated until no keywords remain in the list of available keywords. In another example, the creation of subsets of related media content items can be repeated until a threshold N number of subsets have been created (e.g., two, three, ten, etc.). In yet another example, the creation of subset of related media content items can be repeated until there are no keywords that have a keyword score greater than a particular keyword score threshold.

These subsets of related media content items can be presented to the user having a user device using any suitable approach. For example, a user interface can be presented that includes the search result of "Movie A" and associated information, such as rating information, description information, cast information, and/or playback information concurrently with a subset of related media content items (e.g., "Movie B" and "Movie C").

It should be noted that, in some implementations, the keyword associated with the subset of related media content items can be used to generate a relatedness indicator for presentation along with the subset of related media content items. For example, the keyword "prison escape" can be used to generate a relatedness indicator that displays the text "movies relating to prison escapes" along with the subset of related media content items. In another example, a user interface can be provided that includes the search result of "Movie A" in response to the received search query and a drop-down menu containing various relatedness indicators from the extracted keywords and, in response to receiving a selection of one of the relatedness indicators, an associated subset of related media content items can be presented.

Turning to FIG. 1, an example 100 of hardware for presenting related media content items that can be used in accordance with some implementations of the disclosed subject matter is shown. As illustrated, hardware 100 can include one or more servers, such as a media content server 102, a data server 104, a communication network 106, and one or more user devices 108.

Media content server 102 can be any suitable server for storing media content and delivering the media content to a user device 108 in some implementations. For example, media content server 102 can be a server that streams media content to user device 108 via communication network 106. As a more particular example, in some implementations, media content server 102 can stream media content to user device 108 in response to receiving a request for the media content item from user device 108. Content provided by media content server 102 can be any suitable content, such as video content, audio content, television programs, movies, cartoons, sound effects, audiobooks, streaming live content (e.g., a streaming radio show, a live concert, and/or any other suitable type of streaming live content), electronic books, search results (e.g., search results for people), and/or any other suitable type of content. Content can be created and uploaded to media content server 102 by any suitable entity. In some implementations, media content server 102 can be associated with a particular media content provider, such as a particular media content hosting service, a particular media content streaming service, a particular media content management service, and/or any other suitable media content provider.

Data server 104 can be any suitable server for providing information relating to a media content item (e.g., actor information, plot information, rating information, etc.), keyword information associated with the related media content items, and/or any other suitable information. For example, in some implementations, data server 104 can extract keywords relating to a media content item. In a more particular example, data server 104 can access one or more keyword sources, such as a source that mines movie reviews or a source that determines related entities, to determine keywords associated with a particular media content item. This can includes, for example, sets of keywords, related entities keyword scores and other suitable scores, etc. In some implementations, the keyword sources can indicate similar keywords (e.g., based on a distance score between the two keywords) and eliminate similar keywords from use. In some implementations, information stored on data server 104 can be used to calculate keyword scores and select keywords for creating subsets of related media content items as shown in and described below in connection with FIG. 5.

Communication network 106 can be any suitable combination of one or more wired and/or wireless networks in some implementations. For example, communication network 106 can include any one or more of the Internet, a mobile data network, a satellite network, a local area network, a wide area network, a telephone network, a cable television network, a WiFi network, a WiMax network, and/or any other suitable communication network.

User device(s) 108 can include any one or more user devices suitable for searching for an item of media content, presenting information relating to a media content item and related media content items, and presenting relatedness indicators associated with each subset of related media content items. For example, in some implementations, user device(s) 108 can include mobile devices, such as a mobile phone, a tablet computer, a laptop computer, a vehicle (e.g., a car, a boat, an airplane, or any other suitable vehicle) entertainment system, a portable media player, or any other suitable mobile device. As another example, in some implementations, user device(s) 108 can include non-mobile devices such as a desktop computer, a set-top box, a television, a streaming media player, a game console, or any other suitable nonmobile device.

Although media content server 102 and data server 104 are illustrated as separate devices, any one or more of these devices can be combined into one device in some implementations. Also, although only one each of media content server 102 and data server 104 are shown in FIG. 1 to avoid over-complicating the figure, any suitable one or more of each device can be used in some implementations.

Although only one user device 108 is shown in FIG. 1 to avoid over-complicating the figure, any suitable number of each of these devices, and any suitable types of these devices, can be used in some implementations.

Figure 2:
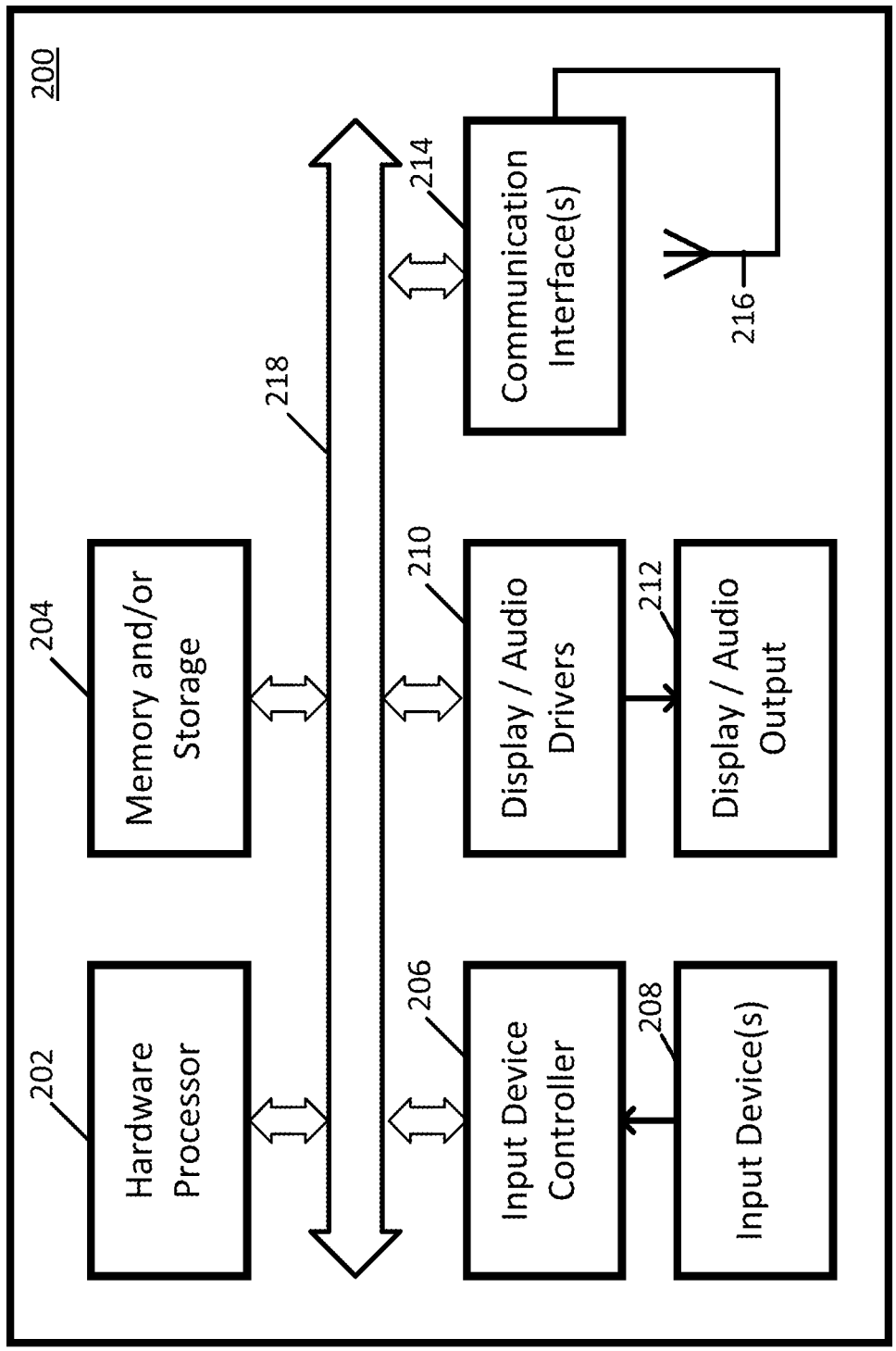
FIG. 2 shows an example of hardware that can be used in a server and/or a user device in accordance with some implementations of the disclosed subject matter.

Media content server 102, data server 104, and user device 108 can be implemented using any suitable hardware in some implementations. For example, in some implementations, devices 102, 104, and 108 can be implemented using any suitable general purpose computer or special purpose computer. For example, a server may be implemented using a special purpose computer. Any such general purpose computer or special purpose computer can include any suitable hardware. For example, as illustrated in example hardware 200 of FIG. 2, such hardware can include hardware processor 202, memory and/or storage 204, an input device controller 206, an input device 208, display/audio drivers 210, display and audio output circuitry 212, communication interface(s) 214, an antenna 216, and a bus 218.

Hardware processor 202 can include any suitable hardware processor, such as a microprocessor, a micro-controller, digital signal processor(s), dedicated logic, and/or any other suitable circuitry for controlling the functioning of a general purpose computer or a special purpose computer in some implementations.

Memory and/or storage 204 can be any suitable memory and/or storage for storing programs, data, media content, and/or any other suitable information in some implementations. For example, memory and/or storage 204 can include random access memory, read-only memory, flash memory, hard disk storage, optical media, and/or any other suitable memory.

Input device controller 206 can be any suitable circuitry for controlling and receiving input from one or more input devices 208 in some implementations. For example, input device controller 206 can be circuitry for receiving input from a touch screen, from one or more buttons, from a voice recognition circuit, from a microphone, from a camera, from an optical sensor, from an accelerometer, from a temperature sensor, from a near field sensor, and/or any other type of input device.

Display/audio drivers 210 can be any suitable circuitry for controlling and driving output to one or more display/audio output circuitries 212 in some implementations. For example, display/audio drivers 210 can be circuitry for driving an LCD display, a speaker, an LED, or any other type of output device.

Communication interface(s) 214 can be any suitable circuitry for interfacing with one or more communication networks, such as network 106 as shown in FIG. 1. For example, interface(s) 214 can include network interface card circuitry, wireless communication circuitry, and/or any other suitable type of communication network circuitry.

Antenna 216 can be any suitable one or more antennas for wirelessly communicating with a communication network in some implementations. In some implementations, antenna 216 can be omitted when not needed.

Bus 218 can be any suitable mechanism for communicating between two or more components 202, 204, 206, 210, and 214 in some implementations.

Any other suitable components can be included in hardware 200 in accordance with some implementations.

Figure 3:
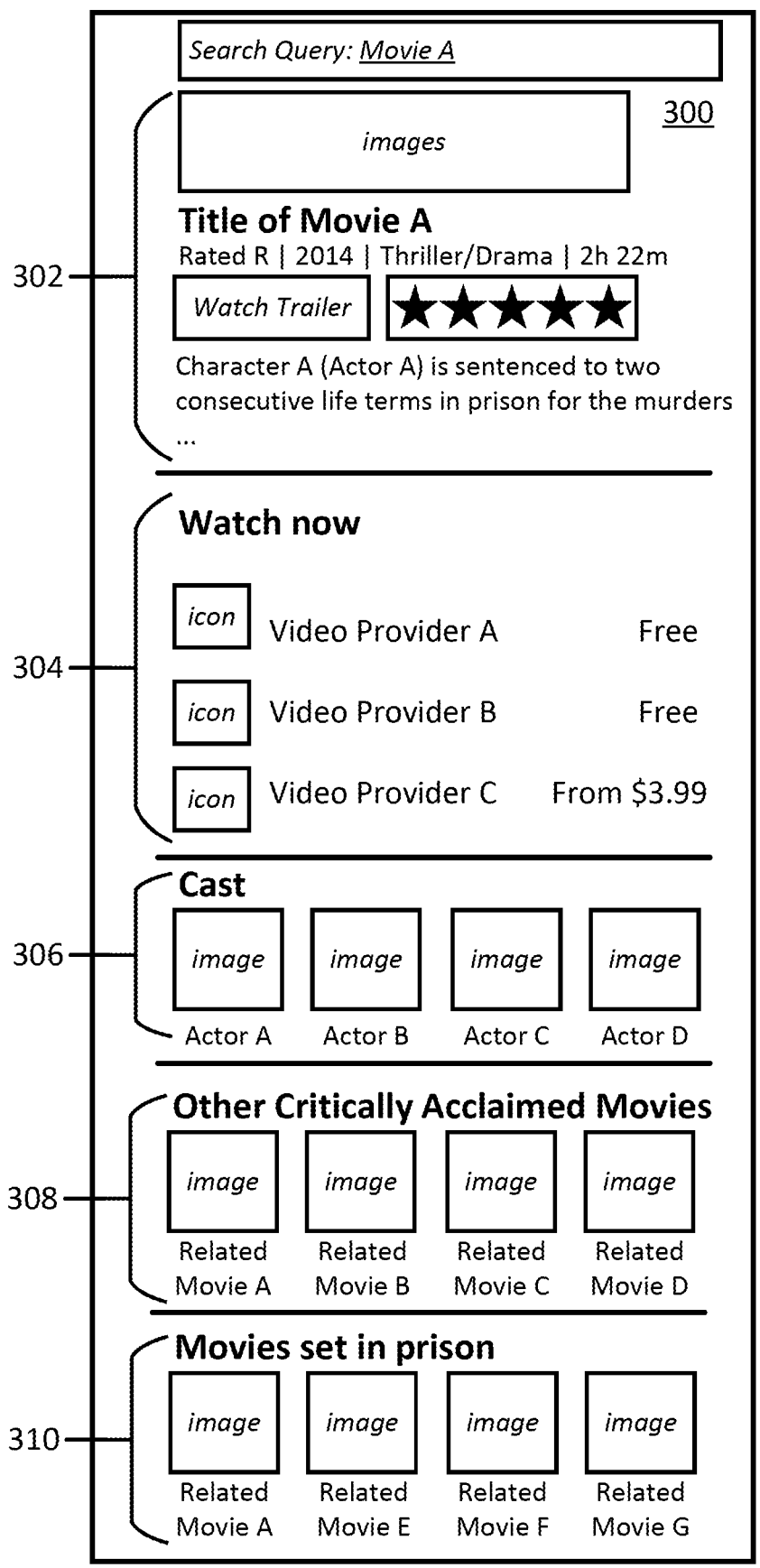
FIGS. 3 and 4 show examples of user interfaces for presenting related media content items in response to a received search query in accordance with some implementations of the disclosed subject matter.

Turning to FIG. 3, an example 300 of a user interface for presenting media content information associated with a media content item responsive to a search query is shown in accordance with some implementations of the disclosed subject matter. In some implementations, user interface 300 can be presented on a user device on which the search query was entered. As illustrated, user interface 300 includes media content information 302, playback information 304, cast information 306, a first subset of related media content items 308, and a second subset of related media content items 310.

Media content information 302 can include any suitable information relating to the search result responsive to a search query. For example, as shown in FIG. 3, media content information can include images relating to the search result, title information relating to the search result, rating information relating to the search result, a link to a trailer video associated with the search result, and description information associated with the search result. Note that, in some implementations, any suitable portion of media content information 302 can be omitted.

In some implementations, user interface 300 can include playback information 302. For example, as shown in FIG. 3, playback information 304 can include individual links to the media content item indicated in the search query, where each link is associated with a different content provider. In some implementations, an individual link can include a content provider name, an icon associated with the content provider, and pricing information (or other suitable economic terms). The content provider name can indicate the name of a content provider of the media content item. For example, in some implementations, the content provider name can indicate the name of a web-based service that streams media content items to the user device. The icon can be an icon associated with the content provider. In some implementations, the icon can include any suitable images, icons, graphics, animations, text, and/or any other suitable content. Pricing information can include a price associated with consuming the media content item. In some implementations, pricing information can indicate a price associated with a one-time viewing of the media content item. Additionally or alternatively, in some implementations, pricing information can indicate a price associated with a subscription to the content provider, such as a fee associated with a monthly subscription. In some implementations, as shown in FIG. 3, pricing information can indicate that consuming the media content item from the associated content provider would be free.

In some implementations, user interface 300 can include cast information 306. For example, as shown in FIG. 3, cast information 306 can include links to information relating to actors or actresses associated with the media content item. Note that, in some implementations, any suitable portion of cast information 306 can be omitted.

In some implementations, user interface 300 can include first subset of related media content items 308 and second subset of related media content items 310. As shown in FIG. 3, each subset of related media content items can include links, associated images, and/or other suitable information for a related media content item. In a more particular example, as shown in FIG. 3, in response to receive a search query for "Movie A," a first subset of related media content items 308 that includes "Related Movie A," "Related Movie B," "Related Movie C," and "Related Movie D" and a second subset of related media content items 310 that includes "Related Movie A," "Related Movie E," "Related Movie F," and "Related Movie G" are presented. It should be noted that a related media content item can be included in multiple subsets of related media content items (e.g., "Related Movie A" in FIG. 3).

In some implementations, a relatedness indicator can be presented along with each subset of related media content items. For example, as shown in FIG. 3, the first subset of related media content items 308 can be presented with a relatedness indicator that states "Other Critically Acclaimed Movies," while the second subset of related media content items 310 can be presented with a relatedness indicator that states "Movies set in prison." In a more particular example, the keyword from the related subset of media content items can include a keyword and a keyword type, such as "Politics (PLOT_OR_THEME)" and a relatedness indicator that incorporates the keyword and keyword type can be generated, such as "Movies having a political plot" or "Movies where the plot relates to politics."

Figure 4:
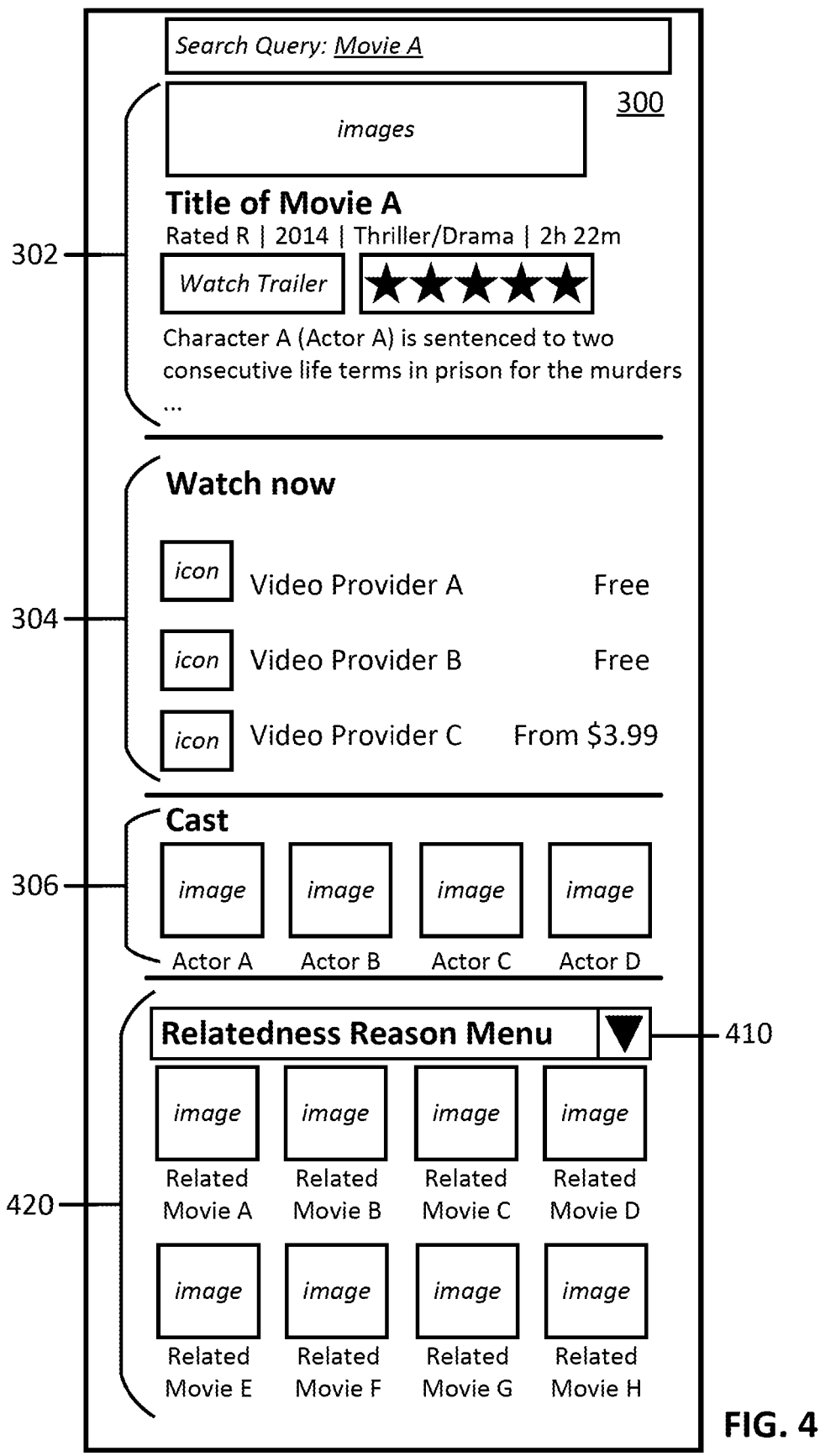

Additionally or alternatively, the relatedness indicator can be presented as a dropdown menu and/or any other suitable user interface control. For example, as shown in FIG. 4, the relatedness indicator can be used to determine which subset of related media content items is presented. The relatedness indicators or reasons can be ranked ordered based on keyword scores. For example, the keyword having the highest keyword score can be generated into a relatedness indicator or reason (e.g., "Other moves with Actor A") and the relatedness indicator can appear first in drop-down menu 410. In response to receiving a selection of a relatedness indicator from drop-down menu 410, a corresponding subset of related media content items 420 can be presented.

It should be noted that, in some implementations, the subsets of related media content items in FIGS. 3 and 4, as well as the order in which the related media content items are presented within the subset, can be determined based on any suitable criteria and using any suitable technique(s), such as those described below in connection with FIG. 5.

Figure 5:
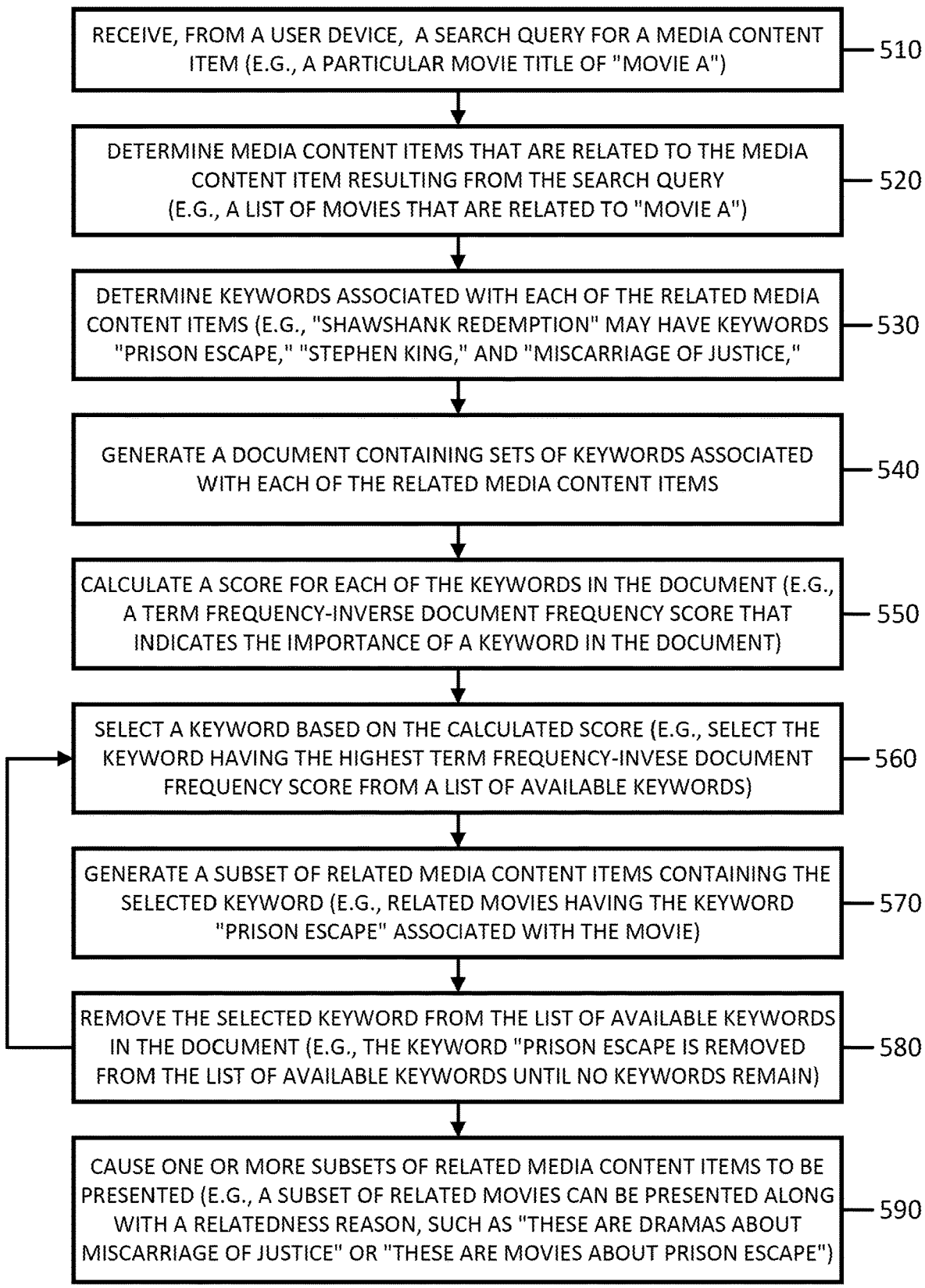
FIG. 5 shows an example of a process for presenting subsets of related media content items based on a keyword score in accordance with some implementations of the disclosed subject matter.

Turning to FIG. 5, an example 500 of a process for receiving a search query for a particular media content item, determining keyword information associated with media content items related to the particular media content item, generating subsets of related media content items, and presenting a user interface that includes one or more of the subsets of related media content items is shown in accordance with some implementations of the disclosed subject matter.

Process 500 can begin by receiving, from a user device, a search query for a media content item at 510. For example, in some implementations, the search query can include a name of a particular television program, a particular movie, a particular song, a particular book, a particular person, etc. As another example, in some implementations, the search query can include a name and/or an identifier of a particular episode of a particular television program. In a more particular example, the search query can be inputted into a search interface presented by a media guidance application, such as the one shown in FIGS. 3 and 4.

In response to receiving the search query for a media content item, a search result responsive to the search query can be determined (e.g., the movie "Movie A"). As shown in FIGS. 3 and 4, media content information and any suitable information relating to the search result can be presented in response to the received search query. For example, media content information can include images relating to the search result, title information relating to the search result, rating information relating to the search result, a link to a trailer video associated with the search result, and description information associated with the search result.

Process 500 can continue by determining media content items that are related to the media content item resulting from the search query at 520. For example, using one or more media content sources or data sources, process 500 can generate a list of media content items that are related to the media content item resulting from the search query. In a more particular example, process 500 can generate a list of movies that are related to the movie "Movie A."

In some implementations, at 530, process 500 can extract keywords that are associated with each of the related media content items determined in 520. For example, movies that are deemed to be related to the movie "Movie A" can include keywords, such as "prison escape," "Author A," "Main Character A," "miscarriage of justice," etc. Keywords can be determined for each related media content item using any suitable approach. For example, in some implementations, process 500 can access one or more keyword sources to obtain relevant keywords that are associated with each media content item that appears in a list of related media content items from 520. In a more particular example, keyword sources can include sources that mines movie reviews or content reviews, sources that determine related entity information, sources that determine keywords associated with a particular media content item, sources that include comments, commentary, and/or any other suitable user-generated information relating to content items, etc. In another more particular example, keywords and additional classification information or signals can be determined from multiple keywords sources. For example, a keyword source can be accessed to determine related entity or keyword information along with a related keyword source associated with a media content item (e.g., "John Doe (0.2)" and "Steven Director (0.15)"). In yet another more particular example, keyword sources can include one or more sources that have been selected by a user (e.g., a selection of a particular source that includes user-preferred reviews of content items, a selection of a particular source that the user has a subscription, etc.).

In some embodiments, a graph of related media content items can be generated. The graph along with information from the one or more keyword sources can be used to determine a number of strongly related media content items (e.g., a relatedness score that is greater than a given threshold value with the same keyword), a total number of related media content items with the same keyword, an average score of a current keyword in related media content items, an average relatedness strength of related media content items with the same keyword, etc. For example, to generate the graph of related media content items, each related media content item that is related to a single media content item can be assigned a weight that is proportional to its relatedness score to the single media content item (weightR) and each keyword (K) can be assigned a power that is proportional to its original relevance to the single media content item (powerK). In continuing this example, a similarity function between two keywords (simK1K2) can be defined as a function proportional to a Jaccard distance between the tops of two collections of media content items assigned to those keywords.

In a more particular example, for each partial permutation of (K1, K2, K3) in Keywords (M):

$$\text{power}_{K2} := \text{power}_{K2}/(1-\text{sim}_{K1K2})$$

$$\text{power}_{K3} := \text{power}_{K3}/(1-\text{sim}_{K1K3})/(1-\text{sim}_{K2K3})$$

```
score:=0
For each related media content item R in Related (M):

for each K in (K1,K2,K3)

score+=weight_R*power_K weight_R:=weight_R-weight_R*power_K
```

In this example, if the weight and power are set to 1, related movies containing the keyword can be counted and can be eliminated from use by another keyword.

It should be noted that, in some implementations, the one or more keyword sources can indicate which keywords should be removed and/or clustered together. For example, the keyword source can determine that the keywords "World War" and "World War II" would yield similar related media content items and, as such, these keywords should be clustered together and represented by a single keyword instance.

It should also be noted that, in some embodiments, a user of the media guidance application can indicate one or more keyword sources, one or more keyword types, and other suitable keyword information for use in determining subsets of related media content items and relatedness information. For example, the user can be presented with an interface for selecting from multiple keyword sources (e.g., a source that includes reviews of media content items, a source that includes social media contacts that provide commentary on one or more media content items, etc.). In another example, the user can provide specific authorization to access one or more user accounts associated with the user (e.g., messaging accounts, media provider accounts, social media accounts, etc.), which can be accessed to determine a subset of keywords that are used in association with one or more of the user accounts. In yet another example, the user can indicate factors that are relevant for generating a keyword score (e.g., weighting one keyword source differently from another keyword source).

In some implementations, the extracted keywords and the related media content items can be treated a document at 540 and a keyword score can be determined for each of the extracted keywords at 550.

For example, a keyword score for each of the extracted keywords can be calculated based on a term frequency (TF) and an inverse document frequency (IDF) (e.g., a TFIDF score). In a more particular example, a term frequency (TF) that represents a frequency of occurrence of the keyword within a field associated with a related media content item can be calculated and an inverse document frequency (IDF) that represents a frequency of occurrence of the keyword across different fields corresponding to the related media content items, such as in a whole document, can be calculated, where the term frequency (TF) and the inverse document frequency (IDF) can be combined to generate the keyword score for each of the extracted keywords. Term frequency (TF) and inverse document frequency (IDF) can be combined, for example, by the multiplication of term frequency (TF) and inverse document frequency (IDF).

In a more particular example, upon determining that the related movie "The Lord of the Rings: Fellowship of the Ring" has the associated keywords "JRR Tolkien," "Fantasy," "Magic," "Lord of the Rings," and "Peter Jackson," etc., each keyword can receive a keyword score—e.g., keywords JRR Tolkien (0.742), Fantasy (0.684), Magic (0.648), Lord of the Rings (0.632), and Peter Jackson (0.586).

Upon generating a keyword score for each of the extracted keywords, a keyword can be selected based on the keyword score at 560. For example, the keyword having the highest keyword score can be selected for use. In a more particular example, the keyword "prison escape" having the keyword score 0.824 can be selected for having the highest keyword score among the list of available keywords and for having a keyword score greater than a particular threshold keyword score (e.g., greater than 0.600).

In response, at 570, each of the related media content items containing the selected keyword can be placed into a subset of related media content items. For example, each movie having the same keyword "prison escape" can be placed into a subset of related media content items relating to "prison escape." It should be noted that the order of the related media content items in the subset of related media content items can be determined based on term frequency (e.g., the frequency of occurrence of the keyword in the media content item) or any other suitable metric.

In some implementations, as shown in FIG. 5, the use of keywords to create subsets of related media items can be repeated. For example, after generating the subset of related media content items that relate to "prison escape," the previously selected keyword can be removed from a list of available keywords at 580 and process 500 can return to 560 to select another keyword (e.g., the keyword having the highest keyword score now that the previously used keyword has been removed). Each of the related media content items containing this next selected keyword can be placed into another subset of related media content items.

It should be noted that the creation of subsets of related media content items can be repeated any suitable number of times and based on any suitable criterion. For example, the creation of subsets of related media content items can be repeated until no keywords remain in the list of available keywords. In another example, the creation of subsets of related media content items can be repeated until a threshold N number of subsets have been created (e.g., two, three, ten, etc.). In yet another example, the creation of subset of related media content items can be repeated until there are no keywords that have a keyword score greater than a particular keyword score threshold.

In some implementations, these subsets of related media content items can be presented to the user having a user device using any suitable approach at 590. For example, a user interface can be presented that includes the search result of "Movie A" and associated information, such as rating information, description information, cast information, and/or playback information concurrently with a subset of related media content items (e.g., "Movie B" and "Movie C").

It should be noted that, in some implementations, the keyword associated with the subset of related media content items can be used to generate a relatedness indicator for presentation along with the subset of related media content items. For example, the keyword "prison escape" can be used to generate a relatedness indicator that displays the text "movies relating to prison escapes" along with the subset of related media content items. In another example, a user interface can be provided that includes the search result of "Movie A" in response to the received search query and a drop-down menu containing various relatedness indicators from the extracted keywords and, in response to receiving a selection of one of the relatedness indicators, an associated subset of related media content items can be presented.

In some implementations, the keyword along with keyword information can be used to generate a relatedness indicator for presentation along with the subset of related media content items. For example, the keyword from the related subset of media content items can include a keyword and a keyword type, such as "Politics (PLOT_OR_THEME)" and a relatedness indicator that incorporates the keyword and keyword type can be generated, such as "Movies having a political plot" or "Movies where the plot relates to politics."

It should be noted that, in some implementations, the order of the relatedness indicators in a user interface control (e.g., drop-down menu 410 in FIG. 4) can be determined based on any suitable criterion. For example, the order of the relatedness indicators in dropdown menu 410 of FIG. 4 can be determined based on the keyword score associated with the relatedness indicator.

Examples of user interfaces that include information relating to a media content item responsive to a search query, subsets of media content items related to the media content item (e.g., "Dramas about miscarriage of justice," "Movies about prison escape," "Movies with Actor A," etc.), and relatedness indicators are shown, for example, in FIGS. 3 and 4.

It should be noted that the user interfaces that include subsets of related media content items shown in FIGS. 3 and 4 are merely illustrative. Subsets of related media content items can be shown in any suitable manner. For example, a scrollable banner that is presented above a list of search results can include a subset of related media content items along with a relatedness indicator corresponding to the subset.

It should be understood that at least some of the above described blocks of the process of FIG. 5 can be executed or performed in any order or sequence not limited to the order and sequence shown in and described in the figure. Also, some of the above blocks of the process of FIG. 5 can be executed or performed substantially simultaneously where appropriate or in parallel to reduce latency and processing times. Additionally or alternatively, some of the above described blocks of the process of FIG. 5 can be omitted.

In some implementations, any suitable computer readable media can be used for storing instructions for performing the functions and/or processes herein. For example, in some implementations, computer readable media can be transitory or non-transitory. For example, non-transitory computer readable media can include media such as magnetic media (such as hard disks, floppy disks, and/or any other suitable magnetic media), optical media (such as compact discs, digital video discs, Blu-ray discs, and/or any other suitable optical media), semiconductor media (such as flash memory, electrically programmable read-only memory (EPROM), electrically erasable programmable read-only memory (EEPROM), and/or any other suitable semiconductor media), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

In situations in which the systems described here collect personal information about users, or make use of personal information, the users may be provided with an opportunity to control whether programs or features collect user information (e.g., information about a user's social network, social actions or activities, profession, a user's preferences, or a user's current location). In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

Accordingly, methods, systems, and media for presenting related media content items are provided.

Although the invention has been described and illustrated in the foregoing illustrative implementations, it is understood that the present disclosure has been made only by way of example, and that numerous changes in the details of implementation of the invention can be made without departing from the spirit and scope of the invention, which is limited only by the claims that follow. Features of the disclosed implementations can be combined and rearranged in various ways.

What is claimed is:

1. A method for providing media guidance, the method comprising:
   determining a plurality of media content items that are related to a media content item;
   determining a plurality of keywords associated with each of the plurality of related media content items, wherein each of the plurality of keywords is associated with a keyword type;
   calculating a score for each of the plurality of keywords based at least in part on a frequency each of the plurality of keywords is associated with media content items in the plurality of related media content items;
   selecting a first keyword from the plurality of keywords based at least in part on the score;
   determining a first subset of related media content items, wherein each media content item in the first subset is associated with the first keyword;
   selecting a second keyword from the plurality of keywords based at least in part on the score;
   determining a second subset of related media content items, wherein each media content item in the second subset is associated with the second keyword;
   generating, for each of the first subset and the second subset of related media content items, a relatedness indicator as a phrase that describes the media content items in each of the first subset and the second subset of related media content items, wherein the phrase associated with the first subset of related media content items includes the first keyword and associated keyword type, and wherein the phrase associated with the second subset of related media content items includes the second keyword and associated keyword type; and
   causing a user interface that presents media content information associated with the media content item, wherein the user interface includes (i) the media content information, (ii) playback information that includes links for accessing the media content item from a plurality of content sources, wherein each link for accessing the media content item is associated with pricing information and wherein selection of a link causes the media content item to be played back from a content source associated with the link, (iii) a first row of content items that includes the first subset of related media content items with the relatedness indicator corresponding to the first subset of related media content items from the plurality of content sources, and (iv) a second row of content items that includes the second subset of related media content items with the relatedness indicator corresponding to the second subset of related media content items from the plurality of content sources, wherein each related media content item in the first subset of related media content items and the second subset of related media content items is presented with a related media content item link that, upon selection, causes the user interface to presented the media content information associated with a related media content item corresponding to the related media content item link.

2. The method of claim 1, wherein the plurality of media content items are determined in response to receiving a search query for the media content item.

3. The method of claim 1, wherein the first subset of related media content items are presented in the first row of the user interface with a label that includes the phrase corresponding to the first subset of related media content items, and wherein the second subset of related media content items are presented in the second row of the user interface with a label that includes the phrase corresponding to the second subset of related media content items.

4. The method of claim 3, wherein an order of the first row and the second row within the user interface are determined based on the score associated with each of the first keyword and the second keyword.

5. The method of claim 1, wherein the first keyword relates to a common plot of the first subset of related media content items.

6. The method of claim 1, wherein generating the phrase associated with the first subset of related media content items comprises combining the first keyword with an indication of a type of media content associated with the media content items in the first subset of related media content items.

7. A system for providing media guidance, the system comprising:
   a hardware processor that is configured to:
      determine a plurality of media content items that are related to a media content item;
      determine a plurality of keywords associated with each of the plurality of related media content items, wherein each of the plurality of keywords is associated with a keyword type;
      calculate a score for each of the plurality of keywords based at least in part on a frequency each of the plurality of keywords is associated with media content items in the plurality of related media content items;
      select a first keyword from the plurality of keywords based at least in part on the score;
      determine a first subset of related media content items, wherein each media content item in the first subset is associated with the first keyword;
      select a second keyword from the plurality of keywords based at least in part on the score;
      determine a second subset of related media content items, wherein each media content item in the second subset is associated with the second keyword;
      generate, for each of the first subset and the second subset of related media content items, a relatedness indicator as a phrase that describes the media content items in each of the first subset and the second subset of related media content items, wherein the phrase associated with the first subset of related media content items includes the first keyword and associated keyword type, and wherein the phrase associated with the second subset of related media content items includes the second keyword and associated keyword type; and
      cause a user interface that presents media content information associated with the media content item, wherein the user interface includes (i) the media content information, (ii) playback information that includes links for accessing the media content item from a plurality of content sources, wherein each link for accessing the media content item is associated with pricing information and wherein selection of a link causes the media content item to be played back from a content source associated with the link, (iii) a first row of content items that includes the first subset of related media content items with the relatedness indicator corresponding to the first subset of related media content items from the plurality of content sources, and (iv) a second row of content items that includes the second subset of related media content items with the relatedness indicator corresponding to the second subset of related media content items from the plurality of content sources, wherein each related media content item in the first subset of related media content items and the second subset of related media content items is presented with a related media content item link that, upon selection, causes the user interface to presented the media content information associated with a related media content item corresponding to the related media content item link.

8. The system of claim 7, wherein the plurality of media content items are determined in response to receiving a search query for the media content item.

9. The system of claim 7, wherein the first subset of related media content items are presented in the first row of the user interface with a label that includes the phrase corresponding to the first subset of related media content items, and wherein the second subset of related media content items are presented in the second row of the user interface with a label that includes the phrase corresponding to the second subset of related media content items.

10. The system of claim 9, wherein an order of the first row and the second row within the user interface are determined based on the score associated with each of the first keyword and the second keyword.

11. The system of claim 7, wherein the first keyword relates to a common plot of the first subset of related media content items.

12. The system of claim 7, wherein generating the phrase associated with the first subset of related media content items comprises combining the first keyword with an indication of a type of media content associated with the media content items in the first subset of related media content items.

13. A non-transitory computer-readable medium containing computer executable instructions that, when executed by a processor, cause the processor to perform a method for providing media guidance, the method comprising:
   determining a plurality of media content items that are related to a media content item;
   determining a plurality of keywords associated with each of the plurality of related media content items, wherein each of the plurality of keywords is associated with a keyword type;

calculating a score for each of the plurality of keywords based at least in part on a frequency each of the plurality of keywords is associated with media content items in the plurality of related media content items;

selecting a first keyword from the plurality of keywords based at least in part on the score;

determining a first subset of related media content items, wherein each media content item in the first subset is associated with the first keyword;

selecting a second keyword from the plurality of keywords based at least in part on the score;

determining a second subset of related media content items, wherein each media content item in the second subset is associated with the second keyword;

generating, for each of the first subset and the second subset of related media content items, a relatedness indicator as a phrase that describes the media content items in each of the first subset and the second subset of related media content items, wherein the phrase associated with the first subset of related media content items includes the first keyword and associated keyword type, and wherein the phrase associated with the second subset of related media content items includes the second keyword and associated keyword type; and causing a user interface that presents media content information associated with the media content item, wherein the user interface includes (i) the media content information, (ii) playback information that includes links for accessing the media content item from a plurality of content sources, wherein each link for accessing the media content item is associated with pricing information and wherein selection of a link causes the media content item to be played back from a content source associated with the link, (iii) a first row of content items that includes the first subset of related media content items with the relatedness indicator corresponding to the first subset of related media content items from the plurality of content sources, and (iv) a second row of content items that includes the second subset of related media content items with the relatedness indicator corresponding to the second subset of related media content items from the plurality of content sources, wherein each related media content item in the first subset of related media content items and the second subset of related media content items is presented with a related media content item link that, upon selection, causes the user interface to presented the media content information associated with a related media content item corresponding to the related media content item link.

14. The non-transitory computer-readable medium of claim 13, wherein the plurality of media content items are determined in response to receiving a search query for the media content item.

15. The non-transitory computer-readable medium of claim 13, wherein the first subset of related media content items are presented in the first row of the user interface with a label that includes the phrase corresponding to the first subset of related media content items, and wherein the second subset of related media content items are presented in the second row of the user interface with a label that includes the phrase corresponding to the second subset of related media content items.

16. The non-transitory computer-readable medium of claim 15, wherein an order of the first row and the second row within the user interface are determined based on the score associated with each of the first keyword and the second keyword.

17. The non-transitory computer-readable medium of claim 13, wherein the first keyword relates to a common plot of the first subset of related media content items.

18. The non-transitory computer-readable medium of claim 13, wherein generating the phrase associated with the first subset of related media content items comprises combining the first keyword with an indication of a type of media content associated with the media content items in the first subset of related media content items.

* * * * *